United States Patent [19]

Shioda

[11] Patent Number: 4,792,174
[45] Date of Patent: Dec. 20, 1988

[54] SNACK TRAY FOR AUTOMOBILE
[76] Inventor: Yoshihiko Shioda, 1422 Eastcrest Dr., #101, Charlotte, N.C. 28205
[21] Appl. No.: 76,073
[22] Filed: Jul. 21, 1987

Related U.S. Application Data

[63] Continuation-in-part of Ser. No. 930,779, Nov. 14, 1986, abandoned.

[30] Foreign Application Priority Data

Nov. 16, 1985 [JP] Japan ................... 60-176704

[51] Int. Cl.$^4$ ................................ B60R 7/06
[52] U.S. Cl. ................. 296/37.12; 108/45; 224/42.42
[58] Field of Search ............ 296/37.1, 37.6, 37.8, 296/37.12; 224/279, 280, 281, 282, 42.42 R; 108/33, 45, 134

[56] References Cited

U.S. PATENT DOCUMENTS

| | | | |
|---|---|---|---|
| 2,263,609 | 11/1941 | Bullard | 108/33 |
| 2,275,060 | 3/1942 | Griffin | 108/45 |
| 2,845,315 | 7/1958 | McCoy | 108/33 |
| 2,905,370 | 9/1959 | Pavol | 108/45 |
| 3,190,241 | 6/1965 | Rodgers et al. | 108/45 |
| 3,899,982 | 8/1975 | Fetzek | 108/45 |
| 4,417,764 | 11/1983 | Marcus et al. | 108/44 |
| 4,619,386 | 10/1986 | Richardson | 296/37.12 |

Primary Examiner—Robert R. Song
Attorney, Agent, or Firm—Shefte, Pinckney & Sawyer

[57] ABSTRACT

An automobile dashboard is provided with a slidably movable flat snack tray which can be selectively withdrawn outwardly from the dashboard into a cantilevered use position and pushed inwardly within the dashboard into a storage position. The flat body of the snack tray is adapted for supporting various snack items and is also provided with a plurality of holes for receiving and retaining drink containers in an upright disposition. In an alternate embodiment, an articulable support is assembled with the snack tray for spaced disposition relative to the tray body in its use position to support the base of drink containers received within the holes and for nesting position with the tray body in its storage position within the dashboard.

5 Claims, 2 Drawing Sheets

SNACK TRAY FOR AUTOMOBILE

This is a continuation-in-part of U.S. patent application Ser. No. 930,779 filed Nov. 14, 1986, in the name of Yoshihiko Shioda entitled Snack Tray for Autumobile, now abandoned.

BACKGROUND OF THE INVENTION

The present invention relates generally to a snack tray for mounting within the dashboard of an automobile.

Heretofore, drink holders and snack trays adapted for use in automobiles have been designed to be supported removably on a window, a door wall, on the seat back of the front passenger seats, or in similar manners. As such, such drink holders and snack trays are accessible and handy for use by automobile passengers but not ordinarily by the driver. Other conventional snack trays are available for placement in the seat, console or floor space within the front area of the passenger compartment. However, such snack trays are also not handy and relatively inconvenient to the automobile driver in that the driver must ordinarily reach uncomfortably to obtain items from the snack tray and must similarly replace such items esentially by feel. Moreover, such snack trays present a greater disadvantage in that more often than not the driver's attention is distracted in reaching for or replacing snack items thereby creating a potential danger of unsafe driving.

In contrast, the present invention provides a snack tray slidably mounted within an automobile dashboard for easy access by both driver and passengers to avoid the aforementioned problems.

SUMMARY OF THE INVENTION

Briefly summarized, the present invention basically includes a snack tray slidably received with an opening formed in the dashboard of an automobile enabling the snack tray to be selectively drawn outwardly from the dashboard into a cantilevered use position and pushed within the dashboard into a storage position. The snack tray includes a generally flat body disposed in a substantially horizontal disposition with a hole formed in the body. In this manner, the snack tray is adapted in its use position to support snack items, drink containers and the like on the tray body.

Preferably, the dashboard opening is formed as a horizontally extending slot centrally within the dashboard intermediate the driver and passenger seating locations of the automobile passenger compartment. The flat body of the snack tray is closely dimensionsed to the dashboard opening to be received therein in the aforementioned horizontal disposition. The flat body of the snack tray presents an upper surface adapted for supporting snack items and the like for ready access in the use position by occupants in either the driver seating location or the passenger seating location, the flat body further having a plurality of holes formed therein for receiving and retaining drink containers and the like in upright disposition. Additionally, the snack tray body has a front edge which faces the passenger compartment in both the use and storage positions of the tray and a handle affixed to the front edge for manipulation of the snack tray between its use and storage positions.

In an alternate embodiment, an articulable support arrangement is disposed below the main body of the snack tray for movement of a support portion of the support arrangement into sapced facing relation with the main body when the snack tray is in its use position to support snack items, drink containers, and the like received within the hole and for movement of the support arrangement into nested relation with the underside of the main body when the snack tray is in its storage position for receipt therewith within the dashboard.

In the preferred form of the alternate embodiment, the support arrangement includes an articulable generally flat bottom plate. The plate is affixed to the underside of the main body at a rearward spacing from the forward leading side of the main body, and a connecting link arrangement is pivotally affixed to the bottom plate and to the main body at a position generally adjacent the forward leading side. The bottom plate is formed with transverse fold lines defining a plurality of sections which are movable with respect to one another for articulation.

DESCRIPTION OF THE PREFERRED EMBODIMENT

Figure 1:
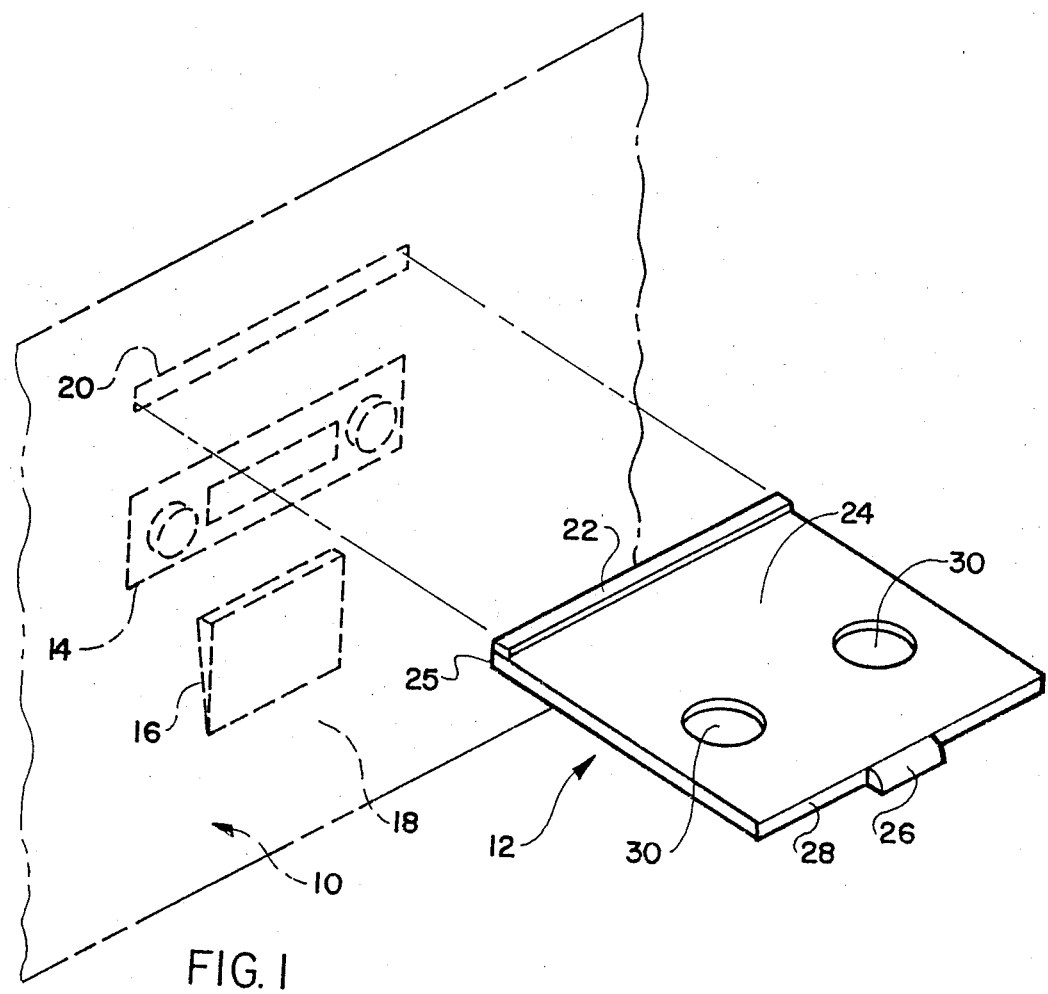
FIG. 1 is a perspective view in exploded fashion of one embodiment of the present snack tray in combination with an automobile dashboard.
Figure 2:
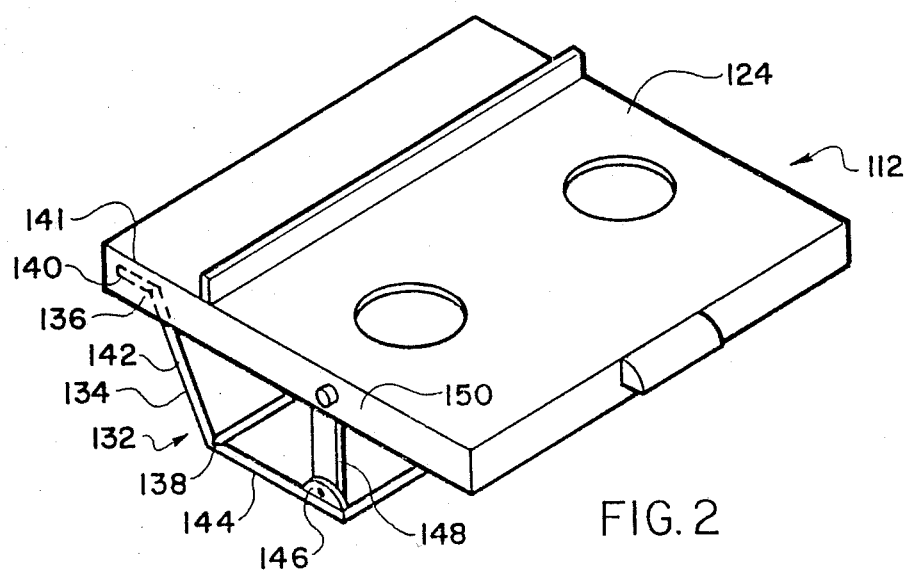
FIG. 2 is a perspective view of a second embodiment of the present snack tray in its use position.
Figure 3:
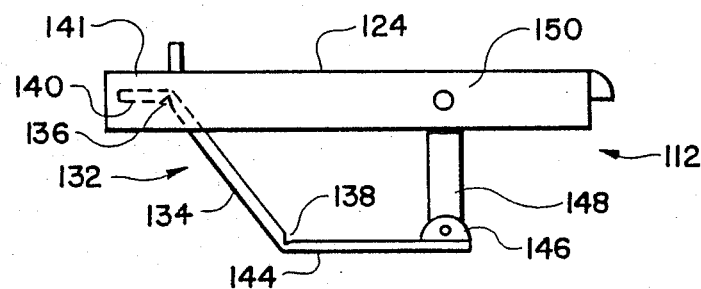
FIG. 3 is a left side view of the snack tray of FIG. 2.
Figure 4:
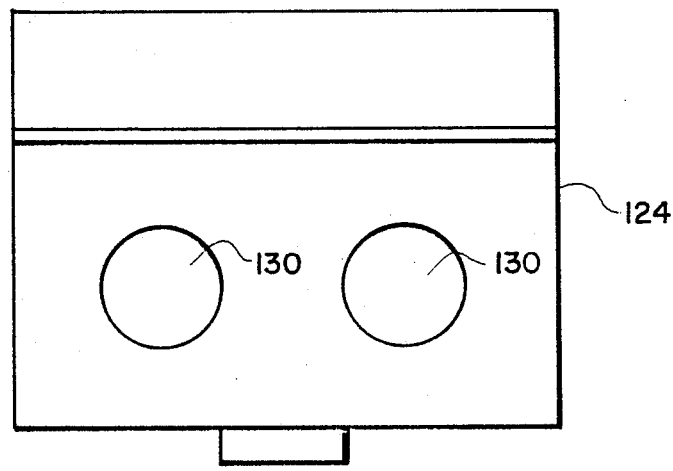
FIG. 4 is a plan view of the snack tray of FIG. 2.

Referring now to the accompanying drawings, and initially to FIG. 1, an automobile dashboard and a compatible snack tray according to one embodiment of the present invention are respectively indicated generally at 10 and 12. As will be understood, the dashboard is positioned immediately forwardly of the front seating area of the passenger compartment of a conventional automobile to extend laterally thereacross from forwardly of the driver seating location to forwardly of the passenger seating location.

As is conventional, the dashboard 10 is provided with normal accessory equipment, such as a radio 14 and an ashtray 16, positioned at the compartment-facing dashboard wall 18 within its central region intermediate the driver and passenger seating locations. According to the present invention, a substantially rectangular longitudinal slot is formed through the facing dashboard wall 18 horizontally thereacross and opens into a hollow cavity within the dashboard 10. Preferably, the slot 20 is formed in a convenient location in the central region of the radio 14 or ashtray 16 to be similarly within the convenient reach of both the driver and any front seat passengers. Of course, the particular positioning of the slot 20 and the adjacent internal cavity of the dashboard 10 should be considered in the initial stages of the design and layout of an automobile dashboard and its ordinary accessory equipment.

The snack tray 12 is of a substantially flat rectangular configuration closely dimensioned to the rectangular configuration of the slot 20 to be fitted within the slot 20 for convenient sliding movement with respect to the dashboard wall 18. A retaining strip 22 is affixed to the flat top surface 24 of the snack tray 12 along its rear edge 25 within the hollow cavity area of the dashboard 10 to prevent complete withdrawal of the snack tray 12 form the dashboard 10 and to stabilize the snack tray 12 during use, as hereinafter explained. A handle portion such as the knob 26 is affixed to the front edge 28 of the snack tray 12 to facilitate sliding manipulation of the snack tray 12 within the slot 20 by either the driver or passengers of the automobile. A pair of circular holes 30 are formed through the snack tray 12 for receiving and holding any conventional can, bottle, cup or similar form of conventional drink container in upright disposition.

In this manner, the snack tray 12 is selectively slidable within the slot 20 for movement with respect to the dashboard 10 from a use position wherein the snack tray 12 is drawn outwardly from the facing wall 18 of the dashboard 10 toward the passenger compartment into a cantilevered position with the retaining strip 22 engaged with the inner surface of the dashboard 10 defining the slot 20. As desired, the retaining strip 22 may be formed of any suitable material such as plastic or could be formed of a gummed material for stricking to a sealing surface (not shown) within the dashboard 10 immediately above the slot 20 to further stabilize the snack tray 12 in its use position. Alternatively, the snack tray 12, when not in use, may be pushed through the slot 20 inwardly within the dashboard 10 to position the front edge 28 at the facing dashboard wall 18. As will be understood, in the use position of the snack tray 12, the flat upper surface 24 thereof is conveniently adapted for supporting a variety of differing snack items while the holes 30 are similarly adapted to receive and hold any beverage or drink container. The weight of such snack items on the cantilevered snack tray 12 acts to retain the strip 22 against the interior dashboard surfaces to stabilize the snack tray 12. Advantageously, the snack tray 12 is conveniently within the reach of the automobile driver to provide easy access to snack items on the snack tray without distracting the driver's view and attention to safe driving. This advantage is especially important to a driver during relatively long driving periods which are frequent in the United States. Further, the snack tray is preferably positioned more conveniently to the driver than the radio 14 or ashtray 16 which are of lesser importance to driver comfort and convenience than food and drink refreshments during relatively long driving trips.

Referring now to FIGS. 2-5, an alternate embodiment of the snack tray of the present invention is indicated generally at 112 and basically includes a flat main body 124 and an articulable support arrangement indicated generally at 132. As desired, the main body 124 may be of substantially identical construction as the body 24 of the embodiment of FIG. 1 and therefore need not be further described herein. For sake of clarity, the elements of the main body 124 are identical in FIGS. 2-5 by reference numerals of the 100 series corresponding to the reference numerals of the elements of the body 24 in FIG. 1.

The articulable support arrangement 132 includes a generally flat bottom plate 134 which is transversely scored at 136,138 at spaced intermediate locations along the plate 134 to form two transverse fold lines defining three relatively pivotable sections 140,142,144 of the plate 134. The rearward section of the plate 134 is fixedly attached as by adhesive to the underside of the main body 124 transversely along the rearward edge 141 of the main body 124, while the forward section 144 has a pair of upright tabs 146 at its opposite lateral sides which are pivotably connected respectively to a pair of connecting links 148 which, in turn, are pivotably connected respectively to opposite lateral side flanges 150 of the main body 124 generally adjacent its forward edge 128.

Figure 5:
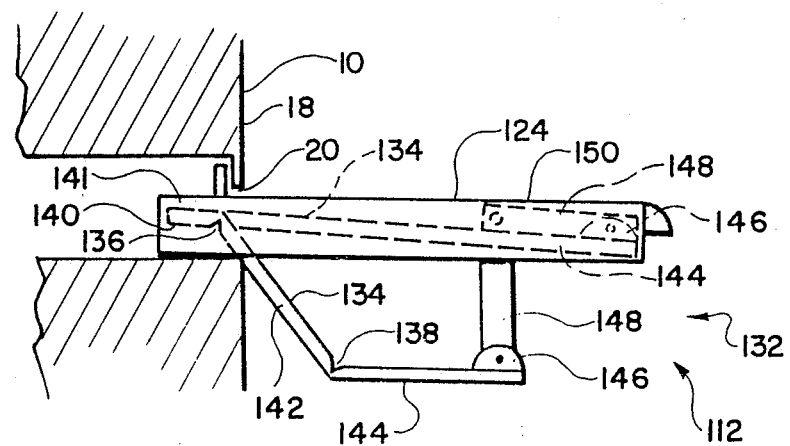
FIG. 5 is a left side view of the snack tray in combination with an automobile dashboard shown in section.

As will thus be understood with reference to FIG. 5, the bottom plate 134 and the links 148 of the support arrangement 132 are articulable between a support disposition shown in solid lines and a nested disposition shown in broken lines. In the support position, the pair of connecting links 148 extend downwardly in essentially perpendicular relation to the main body 124 and, in cooperation with the plate sections 140,142, constrains the forward section 144 of the plate 134 to be oriented in substantially parallel spaced facing relation to the main body 124 beneath the holes 130. In the nested disposition, the connecting links 148 pivot forwardly into an essentially horizontal disposition within the side flanges 150 of the main body 124 to constrain the plate 134 to assume a substantially linear orientation of its sections 140,142,144 also within the main body side flanges 150 generally or nearly parallel to the main body 124. Thus, in the withdrawn use position of the snack tray assembly 112, the support arrangement 132 is enabled to assume its operating disposition, preferably automatically under the force of gravity acting on the plate 134 when the main body 124 is withdrawn, whereby the forward section 144 of the plate 134 is disposed for supporting the base of a drink container, cup, or the like received by any of the holes 130 of the main body 124. On the other hand, when the snack tray assembly 112 is moved to its storage position within the dashboard, the relatively pivotable sections 140,142,144 of the plate 134 and the pair of connecting links 148 may be folded into their nested disposition beneath the main body 124, either by manual folding of the support arrangement 132 or by the force of engagement of the plate section 142 with the dashboard 10 as the main body 124 is pushed therewithin. In this manner, the snack tray assembly 112 requires no larger opening 20 in the dashboard wall 18 than does the snack tray 12 and may be stored within the dashboard 10 in essentially the same space as the snack tray 12.

It will therefore be readily understood by those persons skilled in the art embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In combination with an automobile having a dashboard with an opening formed in said dashboard, a snack tray assembly slidably received within said opening to be selectively drawn outwardly from said dashboard into a cantilevered use position and pushed within said dashboard into a storage position, said snack tray assembly comprising:

a generally flat main body member having at least one hole formed therein and disposed in substantially horizontal disposition in said opening for substantially horizontal movement between said use and storage positions, and a generally flat bottom support member having a plurality of sections articulatable with respect to one another, said support member being affixed movably to said main body member for articulated movement of said support member automatically into an operative position wherein one section of said support member is disposed beneath said hole of said main body member in spaced generally parallel relation thereto when said main body member is moved to its use position to support snack items, drink containers, and the like received within said hole and for articulated movement of said support member automatically into an inoperative position in nested relation with said main body member when said main body member is moved to its storage position for receipt with said main body member within said dashboard.

2. The combination of claim 1 and characterized further in that said bottom support member is hingedly affixed to a bottom surface of said main body member at a relatively inward location thereon with respect to the direction of movement of said main body member outwardly from said dashboard from its storage position to its use position and characterized further by connecting link means pivotably affixed to each of said main body member and said bottom support member at relatively outward locations thereon with respect to said inward location.

3. The combination of claim 1 and characterized further in that said plurality of sections of said bottom support member are pivotable with respect to one another at pivot axes extending transversely with respect to the direction of movement of said main body member between its use and storage positions.

4. The combination of claim 1 and characterized further in that another section of said bottom support member is arranged to be disposed angularly outwardly with respect to said dashboard in said operative position of said bottom support member and to engage said dashboard during movement of said main body member from its use position to its storage position for actuating simultaneous articulation of said support member from its operative position to its inoperative position.

5. The combination of claim 1 and characterized further in that said sections of said bottom support member comprise a plurality of plate portions pivotable with respect to one another at fold lines extending transversely with respect to the direction of movement of said main body member between its use and storage position.

* * * * *

UNITED STATES PATENT OFFICE
CERTIFICATE OF CORRECTION

Patent No. 4,792,174  Dated December 20, 1988

Inventor(s) Yoshihiko Shioda

It is certified that error appears in the above-identified patent and that said Letters Patent is hereby corrected as shown below:

Column 1, line 26   delete "esentially" and insert — essentially — .
Column 1, line 52   delete "dimensionsed" and insert — dimensioned — .
Column 2, line 1    delete "sapced" and insert — spaced — .
Column 3, line 19   delete "stricking" and insert — sticking — .
Column 4, line 43   after "art" add — that the present invention is susceptible of a broad utility and application. Many —

Signed and Sealed this

Twenty-first Day of November, 1989

Attest:

JEFFREY M. SAMUELS

Attesting Officer   Acting Commissioner of Patents and Trademarks